(12) United States Patent
Tamura et al.

(10) Patent No.: US 7,848,269 B2
(45) Date of Patent: Dec. 7, 2010

(54) MOBILE COMMUNICATION SYSTEM, CORE NETWORK APPARATUS, AND MOBILE COMMUNICATION TERMINAL

(75) Inventors: Toshiyuki Tamura, Minato-ku (JP); Stefan Schmid, Heidelberg (DE)

(73) Assignee: NEC Corporation, Tokyo (JP)

( * ) Notice: Subject to any disclaimer, the term of this patent is extended or adjusted under 35 U.S.C. 154(b) by 598 days.

(21) Appl. No.: 11/839,177

(22) Filed: Aug. 15, 2007

(65) Prior Publication Data

US 2008/0043666 A1  Feb. 21, 2008

(30) Foreign Application Priority Data

Aug. 17, 2006 (JP) .............................. 2006-222514
Feb. 9, 2007 (JP) .............................. 2007-030562

(51) Int. Cl.
*H04B 7/00* (2006.01)
(52) U.S. Cl. ..................................... 370/310.2; 370/328
(58) Field of Classification Search ............. 370/310.2, 370/328, 338, 349, 331
See application file for complete search history.

(56) References Cited

U.S. PATENT DOCUMENTS

| 7,142,860 B2 * | 11/2006 | Mildh et al. ................. 455/443 |
| 2009/0275332 A1 * | 11/2009 | Niska et al. ................. 455/436 |

FOREIGN PATENT DOCUMENTS

| JP | 2003-348661 A | 12/2003 |
| JP | 2005-184159 A | 7/2005 |
| KP | 2002-58033 B1 | 7/2002 |
| WO | 99/09774 A1 | 2/1999 |
| WO | WO 03/084269 A1 | 10/2003 |
| WO | WO 2004/093481 A1 | 10/2004 |

OTHER PUBLICATIONS

3rd Generation Partnership Project; Technical Specification Group Services and System Aspects; 3GPP System Architecture Evolution: Report on Technical Options and Conclusions (Release 7) 3GPP TR 23.882 V1.3.0 (Jul. 2006).

(Continued)

*Primary Examiner*—Brenda Pham
(74) *Attorney, Agent, or Firm*—Sughrue Mion, PLLC

(57) ABSTRACT

A mobile communication system for relaying user data includes a plurality of base station apparatus and a core network apparatus. Each of the base station apparatus forms a cell for connecting to a terminal through a wireless link. The core network apparatus can be connected to the base station apparatus. Even when the terminal moves between the base station apparatus while the terminal is in an active mode in which the terminal is communicating, the core network apparatus which is connected to the terminal keeps itself connected to the terminal.

5 Claims, 8 Drawing Sheets

OTHER PUBLICATIONS

NEC: "UPE Relocation" 3GPP Draft; S2-062663-UPE-Relocation, $3^{rd}$ Generation Partnership Project (3GPP), Mobile Competence Center; 650, Route des Lucioles; F-06921 Sophia-Antipolis Cedex; France, col. SA WG2, No. 20060818, Aug. 18, 2006, XP050256655.
Mitsubishi Electric:: "Virtual Location Areas" 3GPP Draft; R3-060490, $3^{rd}$ Generation Partnership Project (3GPP), Mobile Competence Centre; 650, Route des Lucioles; F-06921 Sophia-Antipolis Cedex; France, vol. RAN WG3, No. Sophia Antipolis, France; 20060330. Mar. 30, 2006. XP050159414.

3GPP: "3GPP System Architecture Evolution: Report on Technical Options and Conclusions (Release 7)" vol. 23.882, No. v0.10.0, Jan. 31, 2006, pp. 1,3,29-39, XP002591619.
Samsung: "Discussion on Configuration of tracking area" 3GPP Draft; R3-060148, $3r^{rd}$ Generation Partnership Project (3GPP), Mobile Competence Centre; 650 Route des Lucioles; F-06921 SophiaAntipolis Cedex; France, col. RAN WG3, No. Denver, USA; 20060209. Feb. 9, 2006.

* cited by examiner

MOBILE COMMUNICATION SYSTEM, CORE NETWORK APPARATUS, AND MOBILE COMMUNICATION TERMINAL

This application is based upon and claims the benefit of priority from Japanese Patent Applications No. 2006-222514 filed on Aug. 17, 2006 and No. 2007-030562 filed on Feb. 9, 2007, the content of which is incorporated by references.

BACKGROUND OF THE INVENTION

1. Field of the Invention

The present invention relates to a mobile communication system.

2. Description of the Related Art

At present, efforts are being made at 3GPP (3rd Generation Partnership Project) to study LTE (Long Term Evolution) and SAE (System Architecture Evolution).

One of the important themes in the study of 3GPP-LTE/SAE is addressed to the control of UPE Relocation (User Plane Entity Relocation). The control of UPE Relocation is the control of the switching of UPEs to which an UE (User Entity) is to be connected (see, for example, JP-A 2003-348661).

An UPE functional entity is an entity for handling user plane processing towards an eNB (eNodeB) or vice versa, and is defined in the core architecture of SAE. Examples of the UPE functional entity include paging initiation, heater compression, and encryption. The UPE functional entity may be located at a node in common with an MME (Mobile Management Entity) functional entity or a dedicated node.

An S1 interface between a core network and an access network interconnects the UPEs in the core network and the eNBs in the access network according to a full-mesh topology through an IP (Internet Protocol) network. Physically, therefore, the eNBs can connect to all the UPEs in a PLMN (Public Land Mobile Network). Even if the scope of eNBs to which the UPEs can be connected is logically limited and defined as the administrative scope of UPEs, an eNB can flexibly be connected to any one of the UPEs whose administrative scope covers the eNB.

An UE camped in LTE is connected to a single UPE at a certain point in time. The UPE to which the UE is connected changes by way of UPE relocation. Normally, UPE relocation takes place when UEs are in an idle mode (LTE_IDLE). The idle mode is a standby mode in which the UEs are not communicating. Though it is preferable for UPE relocation to be possible even in an active mode (LTE_ACTIVE) in which the UEs are communicating, such UPE relocation should be avoided as much as possible to circumvent the need for a complex relocation procedure.

The above related art suffers the following problems:

According to 3GPP-LTE/SAE, it is possible to connect the eNBs and the UPEs through the flexible S1 interface. It is not clear how to define UPEs and their administrative scope as well as how to limit the administrative scope of UPEs not to the entire PLMN, but to a portion thereof. In view of better user data communications, it should be taken into account how to reduce the frequency of UPE relocations that occur when the administrative scope of UPEs is limited.

SUMMARY OF THE INVENTION

It is an object of the present invention to provide a mobile communication system for appropriately connecting a user plane entity and an eNodeB for better user data communications.

In order to achieve the above object, a mobile communication system for relaying user data according to the present invention includes a plurality of base station apparatus and a core network apparatus.

Each of the base station apparatus forms a cell for connecting to a terminal through a wireless link. The core network apparatus can be connected to the base station apparatus.

Even when the terminal moves between the base station apparatus while the terminal is in an active mode in which the terminal is communicating, the core network apparatus which is connected to the terminal keeps itself connected to the terminal.

The above and other objects, features, and advantages of the present invention will become apparent from the following description with references to the accompanying drawings which illustrate examples of the present invention.

DETAILED DESCRIPTION OF THE PREFERRED EMBODIMENTS

An exemplary embodiment of the present invention will be described in detail below with reference to the drawings.

Figure 1:
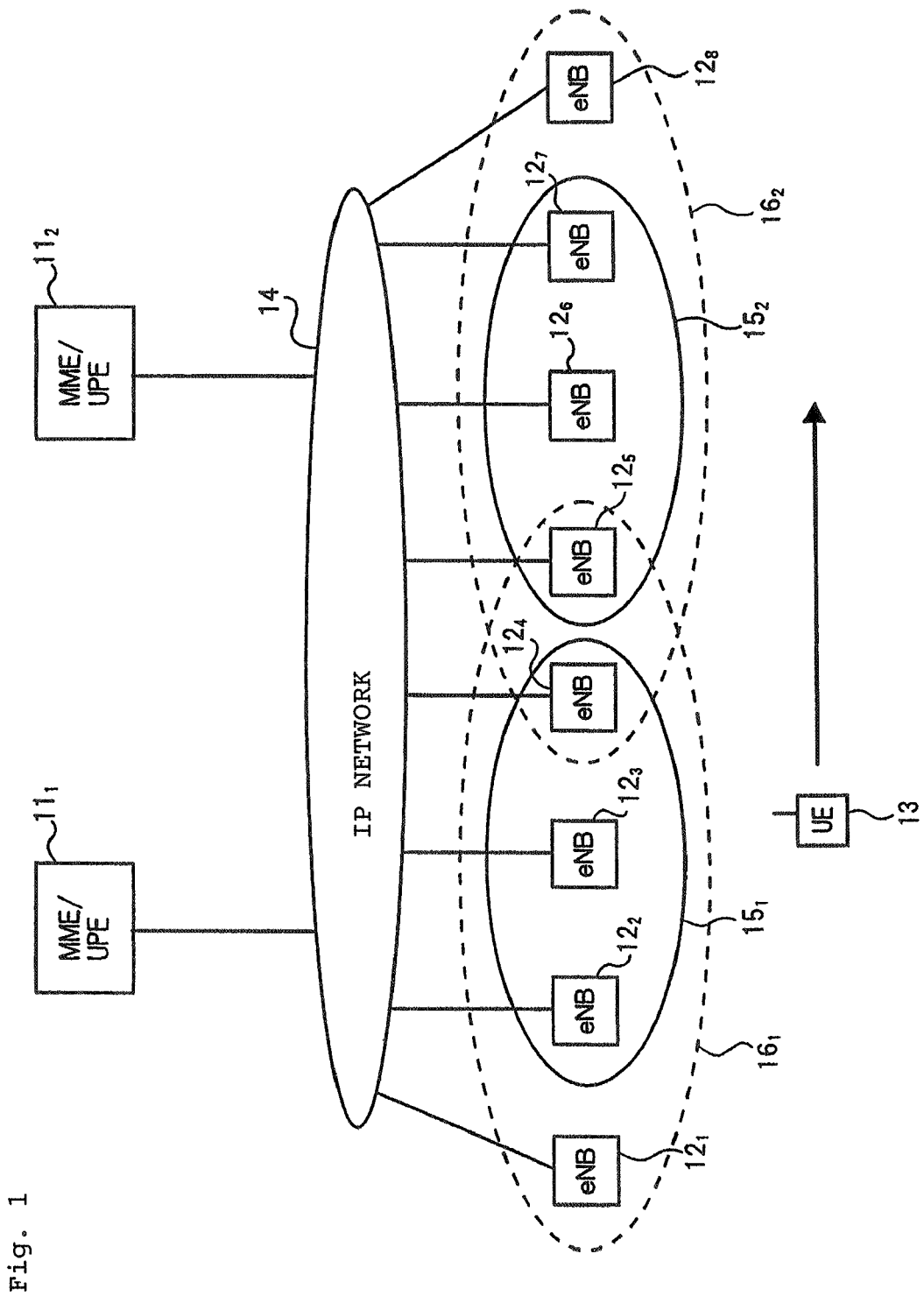
FIG. 1 is a block diagram of a mobile communication system according to an exemplary embodiment of the present invention.

FIG. 1 shows in block form a mobile communication system according to the exemplary embodiment of the present invention. As shown in FIG. 1, the mobile communication system comprises core network apparatus (MME/UPE) $11_1$, $11_2$ and base station apparatus (eNB) $12_1$ through $12_8$. Core network apparatus $11_1$, $11_2$ and base station apparatus $12_1$ through $12_8$ are connected to each other according to a full-mesh topology through IP network 14.

Each of core network apparatus $11_1$, $11_2$ comprises a user plane entity for performing user plane processing and a mobile management entity for performing terminal movement management. Core network apparatus $11_1$, $11_2$ are connected to terminal 13 via base station apparatus 12 and process user data sent to and from terminal 13. Each of core network apparatus $11_1$, $11_2$ is not necessarily constructed as a single node, but may be constructed otherwise. For example, the user plane entity and the mobile management entity of each of core network apparatus $11_1$, $11_2$ may be installed in separate nodes. In such a case, a cluster of those nodes may be considered to be core network apparatus 11.

Each of base station apparatus $12_1$ through $12_8$ forms a cell for connecting to terminal 13 through a wireless link, and is connected to terminal 13 that is located in its cell for allowing communications between core network apparatus 11 and terminal 13.

Since core network apparatus $11_1$, $11_2$ and base station apparatus $12_1$ through $12_8$ are connected to each other according to the full-mesh topology, core network apparatus $11_1$, $11_2$ are physically able to send data to and receive data from all base station apparatus $12_1$ through $12_8$. However, each of core network apparatus $11_1$, $11_2$ has an administrative scope set therein for logically limiting base station apparatus 12 which can be connected thereto, thereby relaxing requirements for the processing capability, the storage capacity, and the functions of core network apparatus $11_1$, $11_2$.

The administrative scope set in each of core network apparatus $11_1$, $11_2$ includes separately defines administrative scopes, i.e., an administrative scope with respect to terminal 13 that is in the active mode and an administrative scope with respect to terminal 13 that is in the idle mode. The active mode refers to a mode in which the terminal is communicating, and the idle mode refers to a mode in which the terminal is not communicating. The administrative scope with respect to terminal 13 that is in the active mode is referred to as an active mode service area, and the administrative scope with respect to terminal 13 that is in the idle mode is referred to as an idle mode service area. The active mode service area is wider than the idle mode service area. Consequently, the frequency of the switching of user plane entities (UPE relocations) in the active mode is lower than the frequency of the switching of UPE relocations in the active mode.

As shown in FIG. 1, idle mode service area $15_1$ and active mode service area $16_1$ are defined for core network apparatus $11_1$, and idle mode service area $15_2$ and active mode service area $16_2$ are defined for core network apparatus $11_2$.

Idle mode service area $15_1$ includes base station apparatus $12_2$ through $12_4$, and active mode service area $16_1$ includes base station apparatus $12_1$ through $12_5$. Idle mode service area $15_2$ includes base station apparatus $12_5$ through $12_7$, and active mode service area $16_2$ includes base station apparatus $12_4$ through $12_8$.

Core network apparatus 11 separately manages idle mode service area 15 and active mode service area 16 which is wider than idle mode service area 15.

Core network apparatus 11 keeps itself connected to terminal 13 as long as terminal 13 in the idle mode that has been connected thereto through base station apparatus $12_2$ through $12_4$ in idle mode service area 15 is located in idle mode service area 15.

When terminal 13 in the idle mode moves beyond the border of idle mode service area 15, the connection of terminal 13 switches from core network apparatus 11 of idle mode service area 15 as a source to core network apparatus 11 of idle mode service area 15 as a destination. The switching causes a transition from the state in which core network apparatus 11 as the source and an anchor user plane entity, not shown, are connected to each other to the state in which core network apparatus 11 as the destination and an anchor user plane entity, not shown, are connected to each other.

Core network apparatus 11 keeps itself connected to terminal 13 as long as terminal 13 in the active mode that has been connected thereto through base station apparatus $12_1$ through $12_5$ in active mode service area 16 is located in active mode service area 16.

When terminal 13 in the active mode moves beyond the border of active mode service area 16, the connection of terminal 13 switches from core network apparatus 11 of active mode service area 16 as a source to core network apparatus 11 of active mode service area 16 as a destination. The switching causes a transition from the state in which core network apparatus 11 as the source and an anchor user plane entity, not shown, are connected to each other to the state in which core network apparatus 11 as the destination and an anchor user plane entity, not shown, are connected to each other.

When terminal 13 moves beyond the border of idle mode service area 15 while in the idle mode, the connection of terminal 13 switches from core network apparatus 11 which is managing idle mode service area 15 as a source to core network apparatus 11 which is managing idle mode service area 15 as a destination.

For example, it is assumed that terminal 13, while in the idle mode, moves from the cell of base station apparatus $12_4$ belonging to idle mode service area $15_1$ to the cell of base station apparatus $12_5$ belonging to idle mode service area $15_2$. In this case, terminal 13 activates a UPE relocation to switch its connection from core network apparatus $11_1$ which is managing idle mode service area $15_1$ as a source to core network apparatus $11_2$ which is managing idle mode service area $15_2$ as a destination.

When terminal 13 moves beyond the border of idle mode service area 15 while in the active mode, terminal 30 performs no UPE relocation. When terminal 13 moves beyond the border of active mode service area 16 while in the active mode, the connection of terminal 13 switches from core network apparatus 11 which is managing active mode service area 16 as a source to core network apparatus 11 which is managing active mode service area 16 as a destination.

For example, it is assumed that terminal 13, while in the active mode, moves from the cell of base station apparatus $12_4$ belonging to idle mode service area $15_1$ to the cell of base station apparatus $12_5$ belonging to idle mode service area $15_2$. In this case, terminal 13 activates no UPE relocation. It is assumed that terminal 13 further moves from the cell of base station apparatus $12_5$ belonging to active mode service area $16_1$ to the cell of base station apparatus $12_6$ belonging to active mode service area $16_2$. In this case, terminal 13 activates a UPE relocation to switch the connection from core network apparatus $11_1$ which is managing active mode service area $16_1$ as a source to core network apparatus $11_2$ which is managing active mode service area $16_2$ as a destination.

Figure 2:
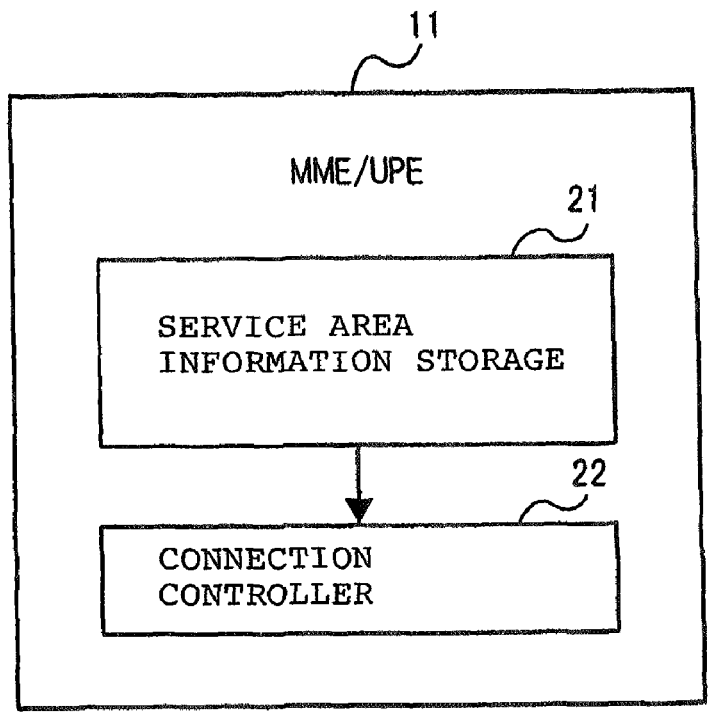
FIG. 2 is a block diagram of a core network apparatus of the mobile communication system according to the exemplary embodiment.

FIG. 2 shows in block form the core network apparatus of the mobile communication system according to the exemplary embodiment. As shown in FIG. 2, core network apparatus 11 comprises service area information storage 21 and connection controller 22.

Service area information storage 21 separately manages the information of an idle mode service area and the information of an active mode service area. The information of an idle mode service area includes a list of base station apparatus 12 belonging to the idle mode service area of its own apparatus. The information of an active mode service area includes a list of base station apparatus 12 belonging to the active mode service area of its own apparatus.

For example, the information of active mode service area $16_1$ of core network apparatus $11_1$ shown in FIG. 1 includes a list of base station apparatus $12_1$ through $12_5$, and the information of idle mode service area $15_1$ of core network apparatus $11_1$ includes a list of base station apparatus $12_2$ through $12_4$.

Connection controller 22 is connected to terminal 13 in the idle mode through base station apparatus 12 in idle mode service area 15, and keeps itself connected to terminal 13 even when terminal 13 moves to any base station apparatus 12 in idle mode service area 15 as long as terminal 13 is located in idle mode service area 15.

Connection controller 22 is connected to terminal 13 in the active mode connected to its own apparatus through base station apparatus 12 in active mode service area 16, and keeps itself connected to terminal 13 even when terminal 13 moves to any base station apparatus 12 in active mode service area 16 as long as terminal 13 is located in active mode service area 16.

Figure 3:
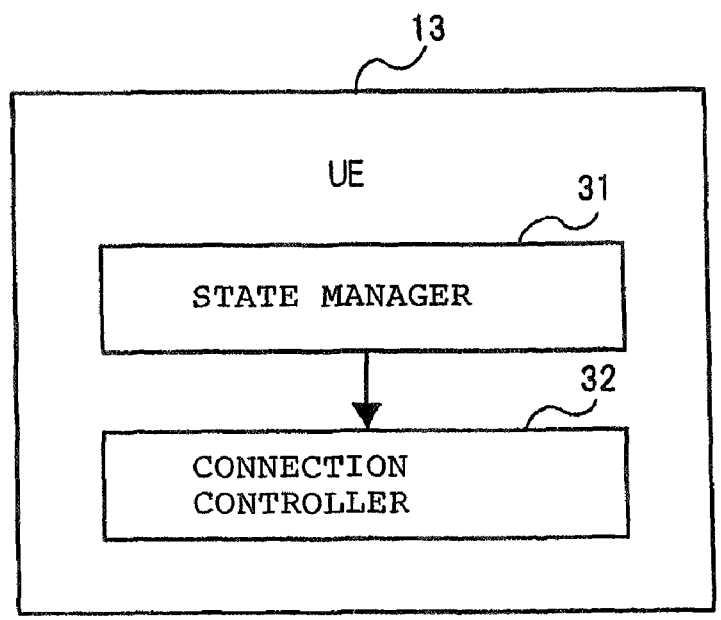
FIG. 3 is a block diagram of a terminal of the mobile communication system according to the exemplary embodiment.

FIG. 3 shows in block form the terminal of the mobile communication system according to the exemplary embodiment. As shown in FIG. 3, terminal 13 comprises a state manager 31 and connection controller 32.

State manager 31 manages whether its own apparatus is in the idle mode or the active mode.

When terminal 13 moves beyond the border of idle mode service area 15 while it is in the idle mode as managed by state manager 31, connection controller 32 switches the connection from core network apparatus 11 which is managing idle mode service area 15 as a source to core network apparatus 11 which is managing idle mode service area 15 as a destination.

When terminal 13 moves beyond the border of active mode service area 16 while it is in the active mode as managed by state manager 31, connection controller 32 switches the connection from core network apparatus 11 which is managing active mode service area 16 as a source to core network apparatus 11 which is managing active mode service area 16 as a destination.

According to the present exemplary embodiment, as described above, the idle mode service area and the active mode service area which is wider than the idle mode service area are separately managed. When the terminal in the idle mode moves beyond the border of the idle mode service area, switching is made between the core network apparatus. When the terminal in the active mode moves beyond the border of the active mode service area, switching is made between the core network apparatus. Consequently, the administrative scope of each user plane entity is limited, and the user plane entities can well be relocated.

When switching is made between the core network apparatus, the cell in which terminal 13 is present may be included in a plurality of service areas. For example, when terminal 13 in the idle mode moves beyond the border of idle mode service area 15, the cell in which terminal 13 is present may be included overlappingly in a plurality of idle mode service areas 15. Similarly, when terminal 13 in the active mode moves beyond the border of active mode service area 16, the cell in which terminal 13 is present may be included overlappingly in a plurality of active mode service areas 16. In such a case, core network apparatus 11 to which the connection of terminal 13 is to be switched may be selected in view of the load state of each of core network apparatus 11. In this manner, the loads on core network apparatus 11 can be distributed and uniformized. The load state of each of core network apparatus 11 may be judged, for example, from the number of terminals 13 connected to core network apparatus 11. If the number of terminals 13 connected to core network apparatus 11 is greater, then the load on core network apparatus 11 is judged as being higher. Based on the history of past movements of terminal 13, a subsequent movement of terminal 13 may be predicted, and core network apparatus 11 may be selected for a reduced number of switchings according to the predicted movement of terminal 13. The frequency of switchings of core network apparatus 11 can thus be lowered. If the load on core network apparatus 11 that is selected as the first core network apparatus based on the predicted movement is high, then next core network apparatus 11 may be selected based on the predicted movement.

When terminal 13, while in the active mode, moves beyond the border of idle mode service area 15, no switching between core network apparatus 11 is activated. Subsequently, terminal 13 may change to the idle mode. In this case, terminal 13 may activate the switching of its connection to core network apparatus 11 which is managing the idle mode service area in which terminal 13 is being positioned. In this fashion, terminal 13 that has changed from the active mode back to the idle mode can be connected to core network apparatus 11 which is covering the idle mode service area with terminal 13 being positioned therein.

In the exemplary embodiment, active mode service area 16 is limited to a certain area of the mobile communication system. However, the present invention is not limited to such a configuration, but is applicable to other schemes. For example, active mode service area 16 of each of core network apparatus 11 may be the entire network (PLMN: Public Land Mobile Network) of the mobile communication system. According to such an example, switching is prevented from taking place between core network apparatus 11 with respect to terminal 13 which is communicating.

In order to apply the mobile communication system according to the above exemplary embodiment to 3GPP-LTE/SAE, it is preferable to revise 3GPP TR23.882 (3rd Generation Partnership Project: Technical Specification Group Services and System Aspects; 3GPP System Architecture Evolution: Report on Technical Options and Conclusions (Release 7)). The revision will be described below.

<<Discussion>>

1. How to organise UPEs and their administrative scope in a scalable way?

One way to relax the strong requirements that UPEs have to be able to service all eNBs in the PLMN is to introduce so called Service Areas, which refine the scope of the S1-flex interface to a set of UPEs that are responsible to service the eNBs covering a LTE area/region. Such Service Areas are also called Pool Areas, as the set of UPEs servicing the area form a pool of UPEs from which eNBs can choose.

Figure 4:
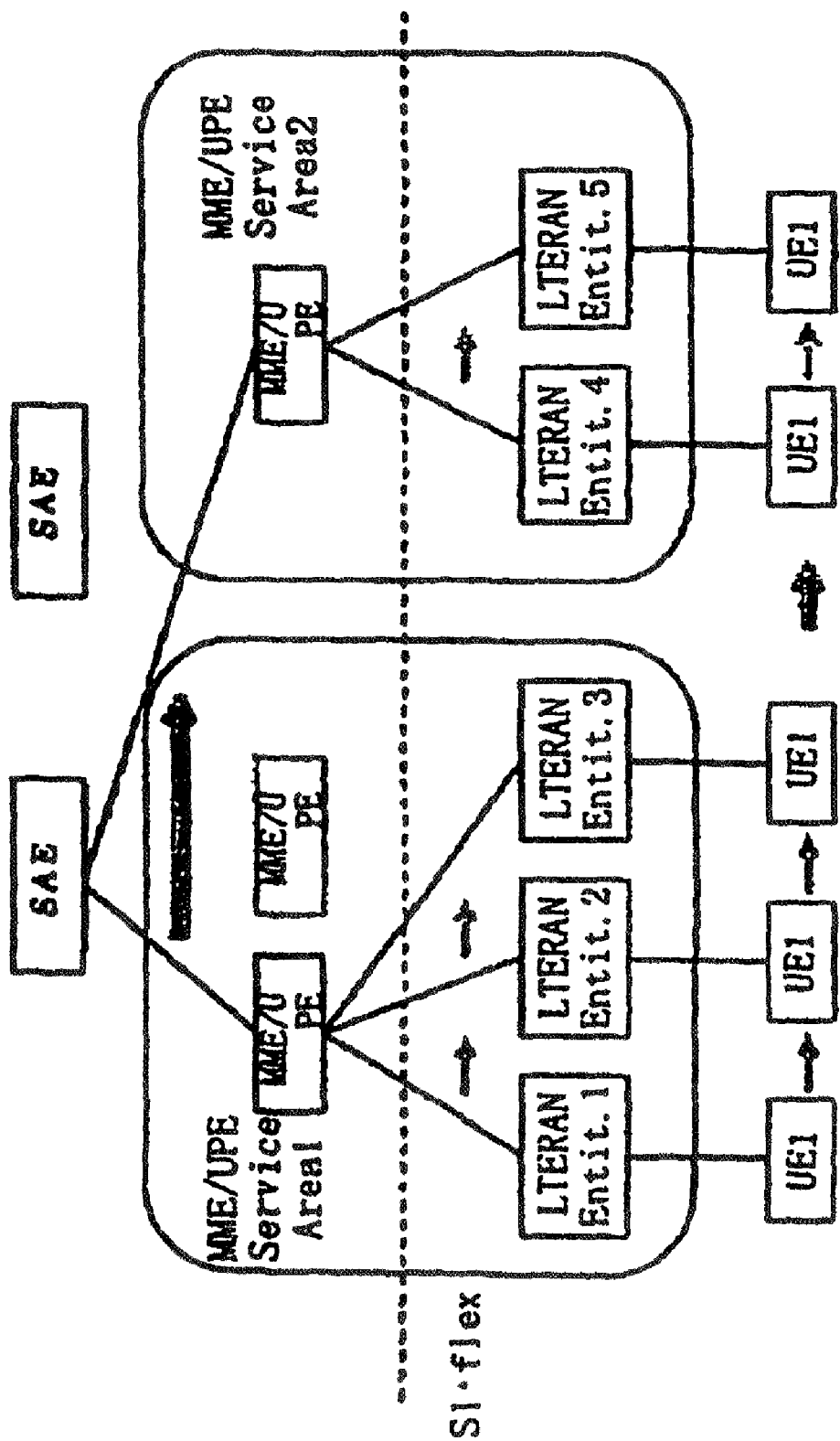
FIG. 4 is a diagram showing conventional UPE service or pool areas with fix/hard UPE relocation boarders at service or pool area boundaries.

As illustrated in FIG. 4 the problem of UPE relocation arises when UEs move across Service Areas—i.e., when the UE hands off to an eNB that is outside the administrative scope of the current serving UPE, relocation to one of the UPEs of the target Service Area is required.

While the concept of Service Areas is quite nice to limit the administrative scope of UPEs and also provides a means to optimize the routing (as a UPE closer to the user's actual location can be selected), the use of fixed area boundaries can constitutes a serious problem. For example, users that cross the service area boundary frequently (e.g., because of their living space) will experience UPE relocation every time they cross.

For LTE_IDLE mode UEs, the drawback is mainly that extra signaling load is introduced every time the UE crosses between Service Areas, which could also be avoided if the Service Area boundaries would not be rigid. However for LTE_ACTIVE mode UEs, the drawback is likely to be more severe as service degradation might be experienced during active communications. As such, frequent UPE relocation for UEs in LTE_ACTIVE mode should be avoided by all means.

To avoid the drawback of fix/hard Service or Pool Area boundaries this contribution proposes a scheme whereby every UPE can have a flexibly configurable service area, which is defined by a set of LTE cells or Tracking Areas. The service area of a UPE defines the LTE area (e.g. cells or TAs) that the UPE can serve.

Figure 5:
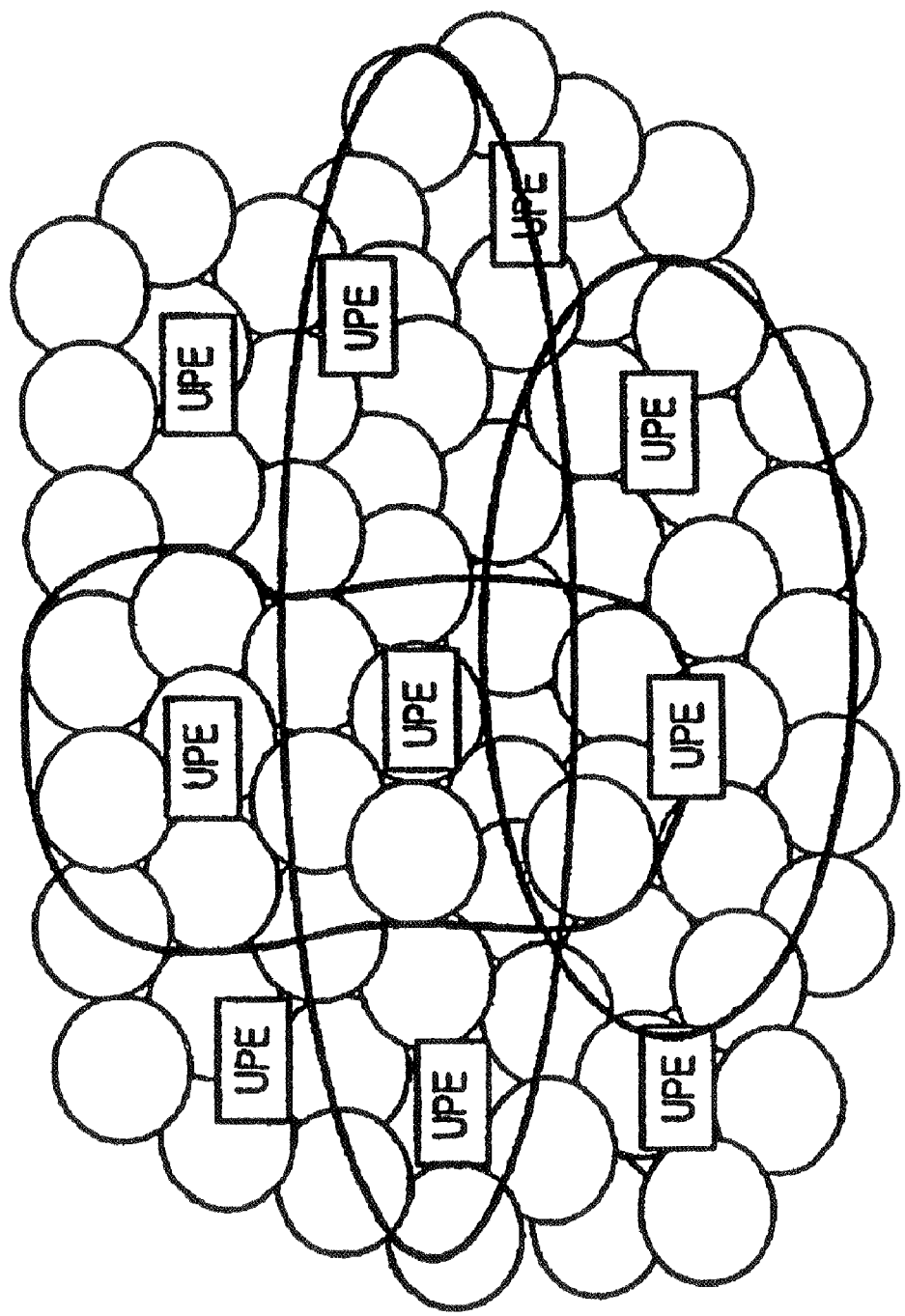
FIG. 5 is a diagram showing per-UPE configurable service areas to avoid the problem caused by fix/hard UPE relocation boarders experienced at pool area boundaries available heretofore.

FIG. 5 illustrates the concept of flexibly configurable service areas per UPE. The figure highlights that operators have full flexibility in the way they want to define/configure the service area of a UPE. Service areas can be as big as the whole PLMN, but could also be limited to a certain regional area (e.g., city, metropolitan area, state) or otherwise defined geographic area (e.g., along a train line or motorway).

An important point is that UPE service areas are typically heavily overlapping so that individual TAs/cells are in most cases covered by several service areas, which allows the system to choose a UPE that is expected to be able to serve a given UE best (e.g., longest).

Figure 6:
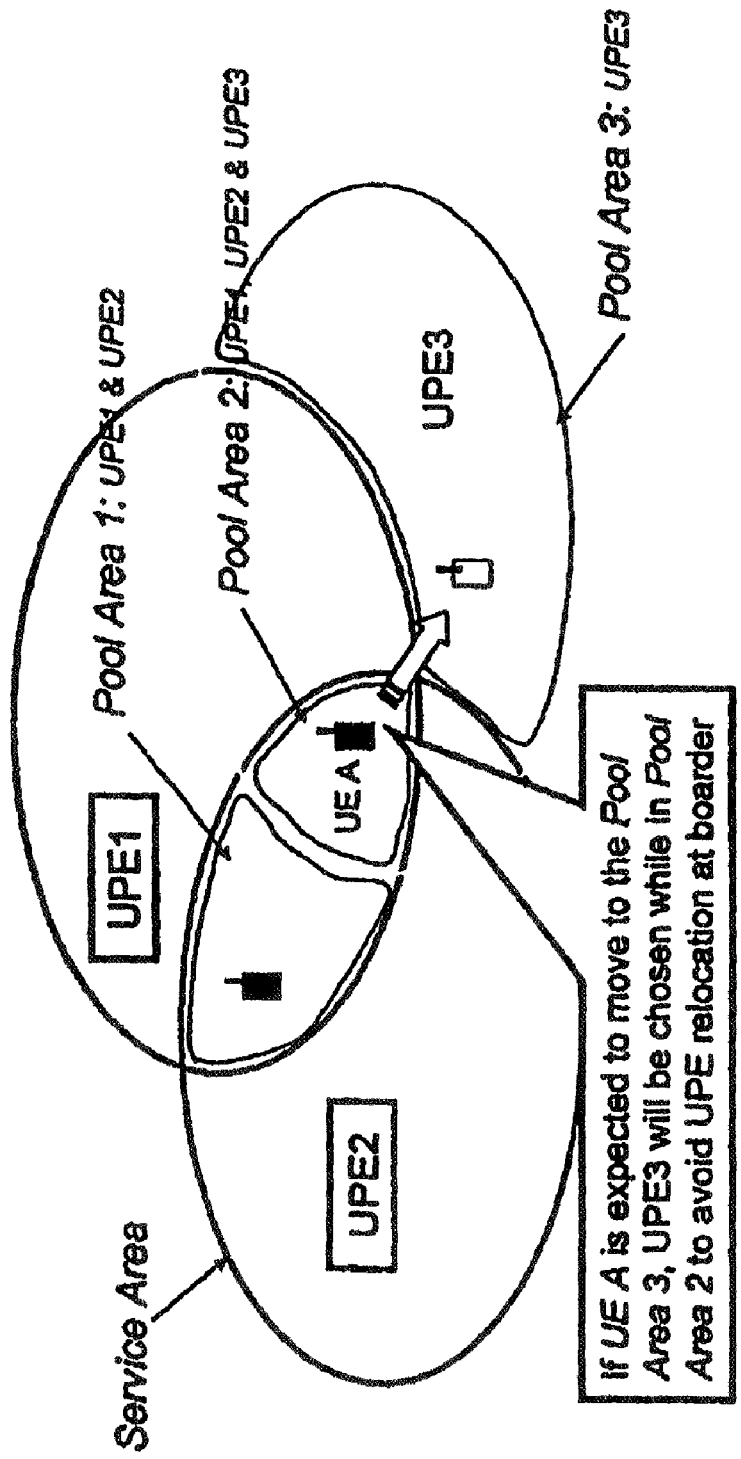
FIG. 6 is a diagram showing overlapping service areas (which are expected to be of a normal configuration) which create implicit "pool areas" at the intersection of a plurality of service areas between neighboring UPEs.

The UPEs that are able to service a certain LTE cell/TA can be considered the "pool" of UPE that is available to handle the UEs while camped in that LTE cell/TA. This is illustrated in more details in FIG. 6. For example, UE A can be served by UPE1, UPE2 or UPE3 while camped in the "Pool Area" 2, as it is located in the service areas of all three UPEs. However, since the UPE service area concept allows a single UPE to be part of many "pool areas", the crossing of a "pool area" boarder does typically not require a UPE relocation, as the serving UPE (if chosen well) is likely be able to also serve the new "pool area".

2. How to reduce the number of UPE relocations (despite limiting the administrative scope of UPEs)?

The problem of how to reduce the number of UPE relocations despite smaller administrative scopes per UPE can be further broken down into the following issues:
 How to select a suitable UPE at attach?
 When to relocate the UPE (both in idle and active mode)?
 How to re-select a new UPE in case of relocation?

<How to Select a Suitable UPE at Attach?)>

Considering that the mobility reach of UEs is most of the time limited to the relatively small geographic region within which the user lives and works, it is clear that a good selection of the initial UPE has a big impact. In case the initially chosen UPE is able to service the LTE area that cover a user's normal living space, there is hardly ever a need to relocate the UPE.

Contribution S2-062662 proposed a scheme that considers taking into account the location and/or mobility history of the UE.

<When to Relocate the UPE (Both in Idle and Active Mode)?>

Since UPE relocation for UEs in LTE_ACTIVE mode should be avoided by all means (to avoid unnecessary service disruption), relocation should only occur when the UE moves outside the administrative scope of its serving UPE. For example, the UE moves across PLMN boundaries.

However, when to relocate UPEs for UEs in LTE_IDLE mode is not obvious. Even in this case, it is desirable to relocate the UPE only from time to time (i.e. when there is sufficient gain) to avoid unnecessary signalling load in the network. For example, UPE relocation after every TA update is generally not desirable and may also lead to unexpected oscillation effects.

On the other hand, avoiding UPE relocation in LTE_IDLE mode until the administrative bounds are reached is also not ideal, as an earlier UPE relocation (while a UE is still in LTE_IDLE mode) may help to avoid a later relocation when the UE is in LTE_ACTIVE mode. Moreover, idle mode UPE relocation can also be desirable in case a UE moves a significant distance from the serving UPE as another UPE might be able to serve the UE later in a more efficient way (e.g. because of route optimisation).

As a consequence, it is desirable to also provide a mechanism that allows flexible configuration when UPE relocation for UEs in LTE_IDLE mode should be considered. As a solution for this, this contribution proposes to introduce the concept of Idle Mode Service Area boundaries for UPEs, which defines when UPE relocation should be considered for UEs in LTE_IDLE mode. I.e. when an idle UE will move beyond the Idle Mode Service Area of the serving UPE, the UPE that serves the UE will be reselected.

Figure 7:
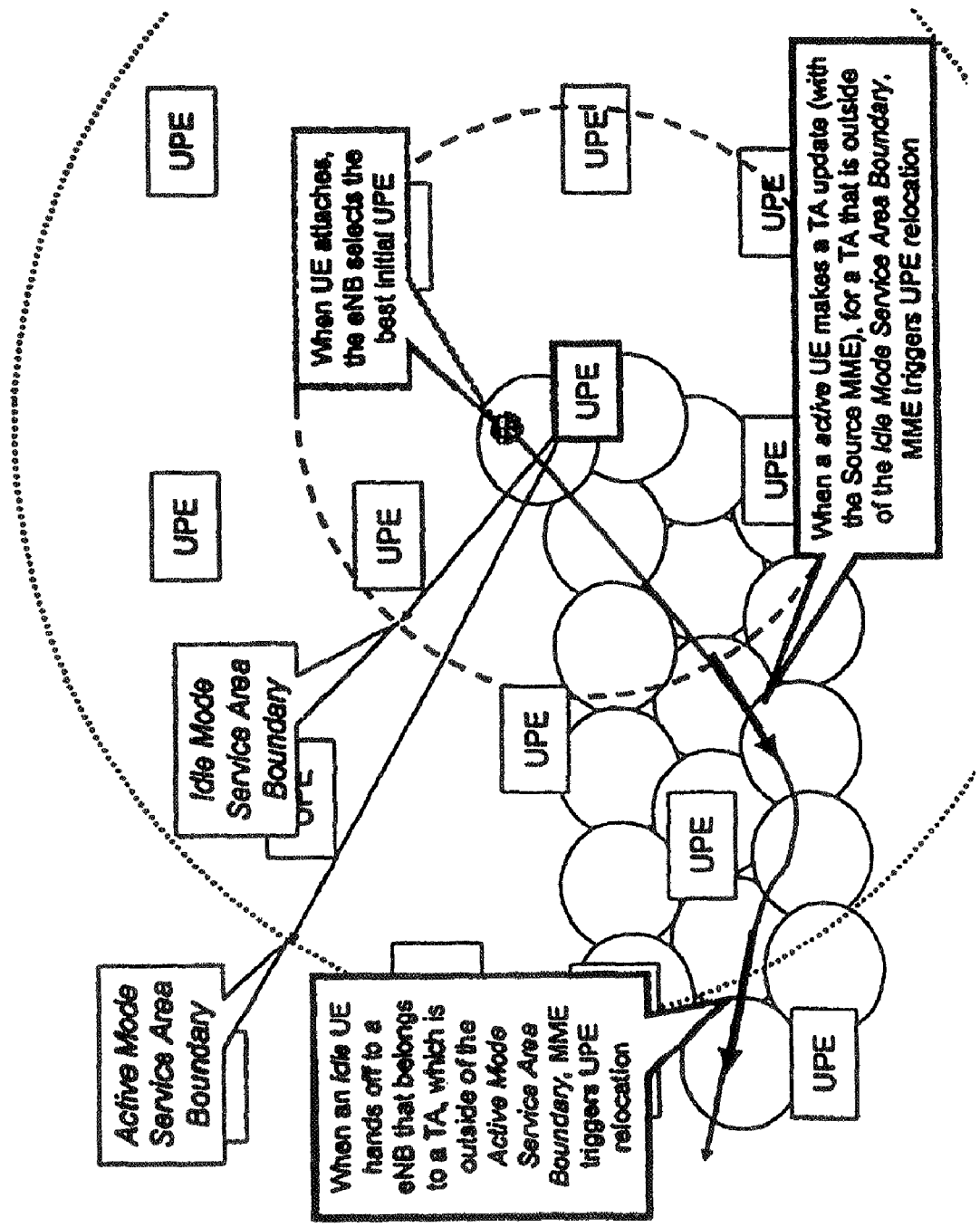
FIG. 7 is a diagram showing per-UPE idle and active mode service areas for allowing relocation at different points (depending on the UE state: idle or active) when moving away from the serving UPE.
Figure 8:
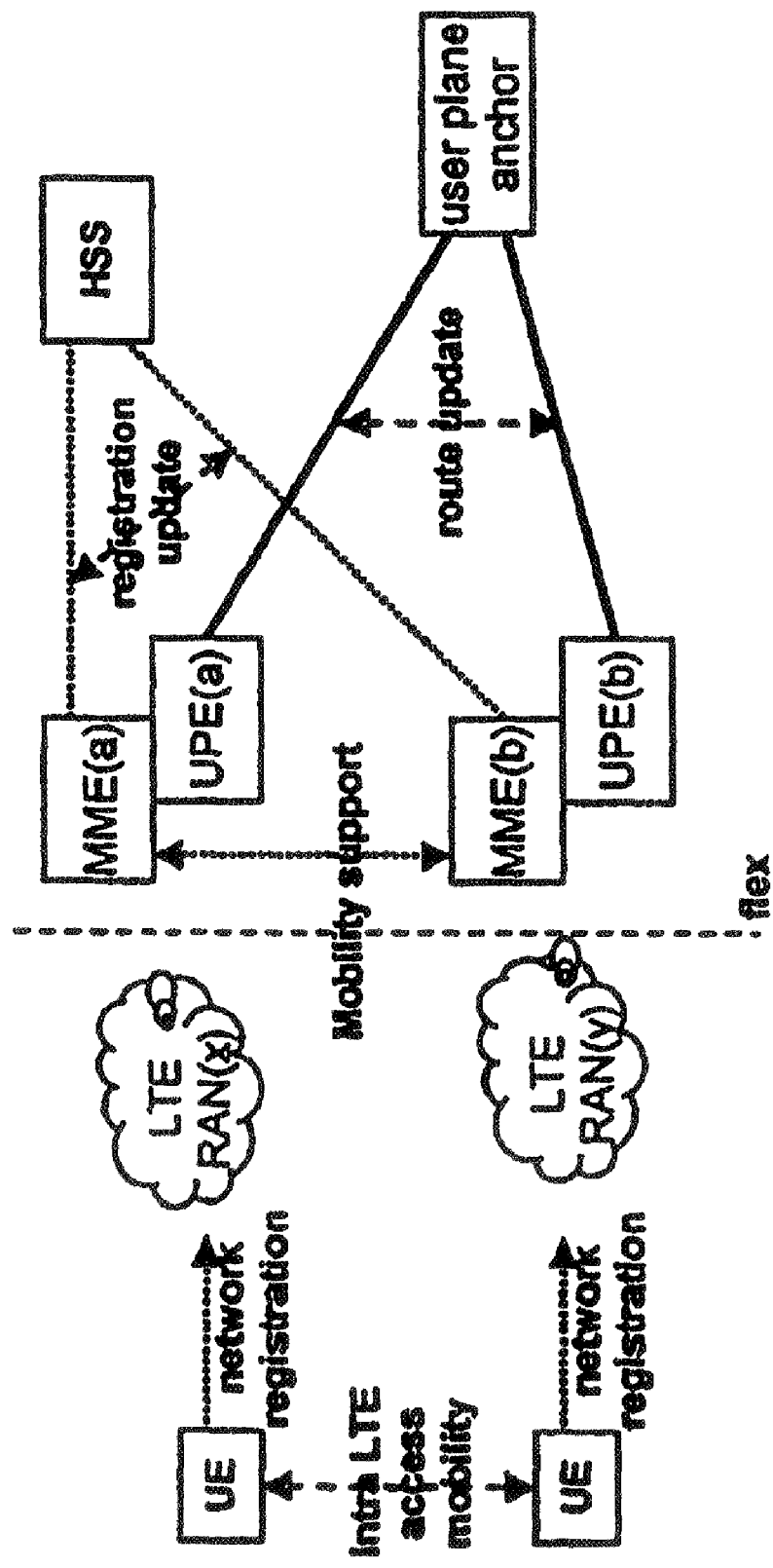
FIG. 8 is a diagram corresponding to FIG. 7.7-1 included in the proposal.
Figure 9:
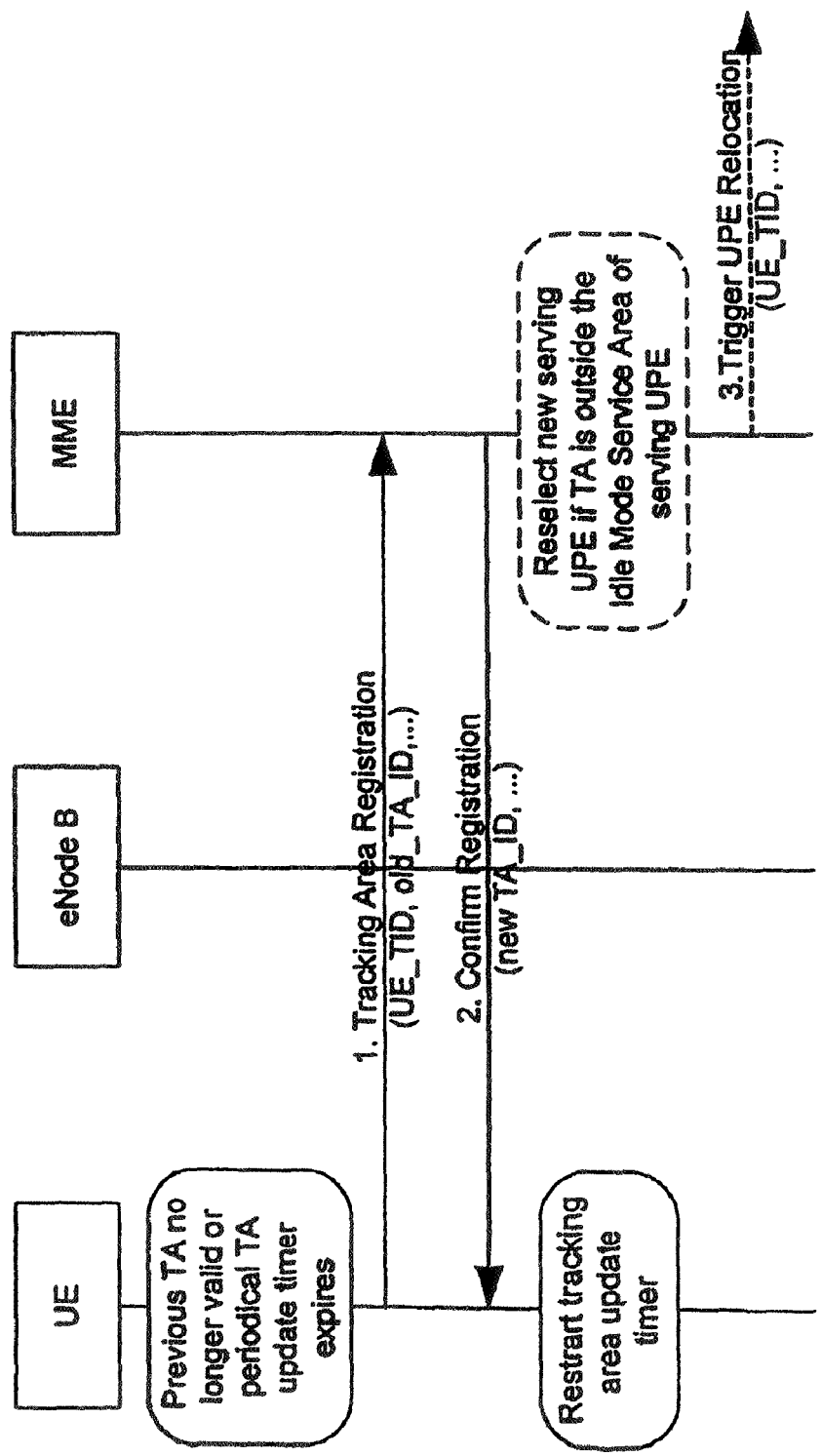
FIG. 9 is a diagram corresponding to FIG. 7.7-2 included in the proposal.

FIG. 7 illustrates the concepts of active mode and idle mode service area boundaries in more details.

Depending on the UE state (idle or active), UPE relocation will be triggered at different points when the UE is moving. For idle UEs, the relocation procedure will be activated when the UE leaves the Idle Mode Service Area of the serving UPE. For active UEs, crossing this boundary has no impact. Only when moving beyond the Active Mode Service Area Boundary, UPE relocation will take place.

Note that in case a UE crosses the Idle Mode Service Area Boundary while it is in LTE_ACTIVE mode, but changes to LTE_IDLE afterwards, then the UE state change will trigger the UPE relocation (since the UE is no long inside the Idle Mode Service Area).

Operators have the advantage to flexibly control when UPE relocation should take place for active and idle mode UEs on a per UPE basis.

<How to Re-select a New UPE in Case of Relocation?>

The final question is how to re-select or choose a new serving UPE when the relocation procedure has been triggered by a moving UE.

The proposal of this contribution is to allow for vendor specific algorithms, which consider, for example, the load of possible UPEs, mobility prediction of the UE and/or other knowledge such as history information of the UE that help selecting a good next serving UPE, which does not need to be changed again soon.

Such algorithms would use a map of the Idle and Active Mode Service Areas of the UPEs, and based on the mobility prediction of a UE (according to the direction, speed, and other information such as location history information of the UE or knowledge of events, routes, tracks, etc.), the algorithm could select the UPE whose idle and/or active mode service area is likely to cover the UE for the longest period (considering the UE state: active or idle mode). In case the selected UPE is highly loaded (above a certain threshold), the algorithm would choose the next UPE that is expected to be able to service the UE for the second longest time.

<<Conclusion>>

This contribution discusses the issue of UPE relocation. It identifies the problem of S1-flex without administrative scope (as UPE would have to be able to serve every eNB in the PLMN) and the limitations of fixed UPE service or pool areas (which perform sub-optimal for UEs moving regularly across the boundary).

To address these problems/limitations, the contribution proposes a scheme whereby flexible service areas can be defined per UPE for both idle and active mode UEs. Depending on the UE mode, UPE relocation will be triggered at different times depending on the UE state (based on the operator configured idle or active mode service areas). Allowing UPE relocation at different points when moving away from the serving UPE can also help avoiding the need for active mode UPE relocations (e.g., earlier idle mode relocations can avoid later active mode relocations).

Finally, the contribution proposes to allow for vendor specific UPE reselection algorithms that take the knowledge of the idle and active mode service areas as well as mobility prediction and/or other information of the UE into account when selecting a new serving UPE.

<<Proposal>>

It is proposed to capture the following definitions and concepts in Section 3.1 and Section 7.7.2 of TR 23.882:

***Beginning of First Change***

User Plane Entity (UPE): terminates for idle state UEs the downlink data path and triggers/initiates paging when downlink data arrive for the UE. It manages and stores UE contexts, e.g. parameters of the IP bearer service or network internal routing information. It performs replication of the user traffic in case of interception.

It is FFS whether Charging Information for inter-operator accounting is in UPE or in another functional block.

UPE Idle Mode Service Area: defines the service area within which the UPE shall service a UE in LTE_IDLE mode. The service area is defined based on a set of cells or tracking areas. When the UE leaves the idle mode service area of the current serving UPE while in LTE_IDLE mode, UPE relocation is triggered.

UPE Active Mode Service Area: defines the service area within which the UPE shall service a UE in LTE_ACTIVE mode. The service area is defined based on a set of cells or tracking areas. When the UE leaves the active mode service area of the current serving UPE, UPE relocation is triggered.

Idle State: is LTE_IDLE for SAE/LTE or PMM_IDLE for 2G/3G or URA_PCH, which is FFS

***End of First Change***

***Beginning of Second Change***

7.7.2 Solution for Key Issue Intra LTE-Access-System Mobility in Idle State 7.7.2.1 General The SAE/LTE Access System has an MME (Mobility Management Entity, it is FFS whether it resides in RAN or CN). Furthermore, the SAE/LTE Access System has a UPE (User Plane Entity). The UE registers with the MME and the UPE.

The MME stores a UE context data like permanent and temporary user identities, mobility state, tracking area etc. The MME can store the UE context for long to allow for detach and reattach with temporary identity (user identity confidentiality). The SAE/LTE system consists of distributed MMEs utilising load sharing/redundancy mechanisms (e.g. similar to Iu-flex) enabling mobility of the UE within a certain geographical area without changing the MME. The SAE/LTE system supports inter-MME mobility.

The UPE stores UE context data like parameters of the default IP connectivity service and keeps network internal routing information.

The SAE/LTE Access System combines network attach and establishment of default IP connectivity capabilities (always on), i.e. all parameters required for an IP connectivity service with default QoS are allocated for the UE already at attach. In idle state all data transfer resources between UE and network are released and only information for default IP connectivity is stored in the network.

NOTE 1: Issues w.r.t. IP address re-assignment for inter-MME/UPE mobility need to be clarified.

User identity confidentiality requires the UE to register with the network using a temporary identity. The temporary identity is resolved to a permanent identity by the old serving MME.

UPE relocation in LTE_IDLE mode is triggered when a UE leaves the Idle Mode Service Area (which defines the LTE area within which the UPE should service idle mode UEs) of the serving UPE. Upon exiting this area, a new serving UPE is selected from the list of UPEs that service the target cell. The selection of a new serving UPE shall also consider the load of the possible UPEs and the expected movements of the user based on, e.g., direction and speed of the user, roads or tracks information, knowledge of events, and also information of the past behaviour of the user.

After a new serving UPE has been selected, UPE relocation is triggered. The routing between UPE and the user-plane anchor is updated, unless the two are co-located. It is the precondition for being able to page the UE when downlink data arrive. And, the home register (e.g. HSS) is updated with registration of the UE at another MME/UPE. These functions are shown in the FIG. 7.7-1.

NOTE 2: It is FFS whether inter MME mobility is done with a context transfer (relocation) or a re-attach based scheme.

NOTE 3: The location of the user plane anchor for intra LTE-Access-System mobility is FFS.

FIG. 7.7-1 Shows Intra LTE-Access-System Mobility in LTE_IDLE.

7.7.2.2 Mobility in LTE_IDLE State

The information flow below depicts the mobility in LTE_IDLE State with Tracking Area Registration (when under same MME).

FIG. 7.7-2 Shows Area Registration.

1) UE sends Tracking Area Registration when the previous Tracking Area is no longer valid or periodical Tracking Area Update timer has expired. The Tracking Area Registration message contains UE's old temporary identity, and old Tracking area Identity.

2) MME responds with Confirm Registration. Confirm Registration contains new Tracking Area Identity, and may also contain a new temporary identity for UE.

After the MME confirmed the TA registration, it checks whether the new TA is still within the Idle Mode Service Area of the serving UPE. If not, a new serving UPE is selected.

3) When a new serving UPE has been chosen, the MME triggers the UPE relocation procedure. Further details of the UPE relocation are FFS, as this depends on decision whether MME/UPEs are co-located or not.

***End of Second Change***

While preferred embodiments of the present invention have been described using specific terms, such description is for illustrative purposes only, and it is to be understood that changes and variations may be made without departing from the spirit or scope of the following claims.

What is claimed is:

1. A core network apparatus configured to be connected to a plurality of base station apparatus each for forming a cell for connecting to a terminal through a wireless link, for being connected to a terminal through said base station apparatus, said core network apparatus comprising:

a service area information storage for separately managing the information of an idle mode service area in which a terminal in an idle mode, in which the terminal is not communicating, being connected, and the information of an active mode service area in which a terminal in an active mode, in which the terminal is communicating, being connected, said active mode service area being wider than said idle mode service area, with respect to respective cells of said base station apparatus; and a connection controller for keeping the core network apparatus connected to a terminal in the idle mode which is connected to the core network apparatus through a base station apparatus in said idle mode service area as long as said terminal in the idle mode is located in said idle mode service area, and keeping the core network apparatus connected to a terminal in the active mode which is connected to the core network apparatus through a base station apparatus in said active mode service area as long as said terminal in the active mode is located in said active mode service area.

2. A core network apparatus according to claim 1, wherein when the terminal changes to the idle mode after being moved beyond the border of the idle mode service area while in said active mode, said connection controller switches a destination to which said terminal is to be connected from a core network apparatus to which said terminal is being connected to a core network apparatus which is managing the idle mode service area in which the terminal is positioned at the time.

3. A core network apparatus according to claim 1, wherein said active mode service area comprises an entire network of said mobile communication system.

4. A core network apparatus according to claim 1, wherein a mobile management entity and a user plane entity are installed in separate nodes.

5. A core network apparatus configured to be connected to a plurality of base station apparatus each for forming a cell for connecting to a terminal through a wireless link, for being connected to a terminal through said base station apparatus, said core network apparatus comprising:

a service area information storage means for separately managing the information of an idle mode service area in which a terminal in an idle mode, in which the terminal is not communicating, being connected, and the information of an active mode service area in which a terminal in an active mode, in which the terminal is communicating, being connected, said active mode service area being wider than said idle mode service area, with respect to respective cells of said base station apparatus; and a connection controlling means for keeping the core network apparatus connected to a terminal in the idle mode which is connected to the core network apparatus through a base station apparatus in said idle mode service area as long as said terminal in the idle mode is located in said idle mode service area, and keeping the core network apparatus connected to a terminal in the active mode which is connected to the core network apparatus through a base station apparatus in said active mode service area as long as said terminal in the active mode is located in said active mode service area.

\* \* \* \* \*